United States Patent

[11] 3,557,345

| [72] | Inventors | Heinz Rensch;<br>Hoeckly Oden, Korntal, Germany |
|---|---|---|
| [21] | Appl. No. | 669,052 |
| [22] | Filed | Sept. 20, 1967 |
| [45] | Patented | Jan. 19, 1971 |
| [73] | Assignee | International Standard Electric Corporation<br>New York, N.Y.<br>a corporation of Delaware |
| [32] | Priority | Oct. 5, 1966 |
| [33] | | Germany |
| [31] | | St25951 |

[54] METHOD OF DECODING THE INFORMATION ON PERFORATED TAPES WITH THE AID OF FIBER OPTICS
2 Claims, 2 Drawing Figs.

[52] U.S. Cl..................................................... 235/61.11,
350/96

[51] Int. Cl....................................................... G06k 9/02,
G02b 5/16
[50] Field of Search............................................ 235/61.11,
61.115; 350/96; 340/347

[56] References Cited
UNITED STATES PATENTS

| 2,967,664 | 1/1961 | Ress ............................. | 235/61.11X |
| 2,881,976 | 4/1959 | Greanias ..................... | 235/61.11X |

*Primary Examiner*—Daryl W. Cook
*Attorneys*—C. Cornell Remsen, Jr., Rayson P. Morris, Percy P. Lantzy, Philip M. Bolton and Isidore Togut ABSTRACT: The present invention relates to a method of converting a tape code, preferably an n-out-of-m code, into plain text, in which the scanning of the individual code rows is effected with the aid of parallel light beams.

PATENTED JAN 19 1971

3,557,345

INVENTORS
HEINZ RENSCH
HOECKLEY ODEN

BY *Percy P. Lantz*
ATTORNEY

METHOD OF DECODING THE INFORMATION ON PERFORATED TAPES WITH THE AID OF FIBER OPTICS

Decoding methods employing an optical scanning, such as this one, are very widely known in the field of perforated tape and punched card technique. In this respect it is customary to convert the light signals as permitted to pass through the holes, into electrical signals with the aid of photoelectric cells, with these electric signals then being decoded in the usual way, e.g. with the aid of diode AND-circuits, or relays, to provide one single output.

Object of the present invention is to considerably reduce the expenditure involved. According to the invention this is accomplished in that for the decoding purpose there are used fiber optics which—by starting out from the possible points permitting the passage of light through the holes as the perforated tape is being moved past—in accordance the code, are joined and bonded with at $n$ of their rearward ends at $n$-out-of-$m$ different points corresponding to the plain text and lying in a plane parallel with the cross section of the tape to be analyzed so that the light beams passing through the $n$ holes of a code combination are led to the junction of these fiber optics where they produce a light intensity which distinctly differs from that at any other junction were less than $n$ fiber optics are involved in the supply of light.

In one preferred type of embodiment of the invention, the junctions of the fiber optics are arranged immediately in front of a ground or frosted glass plate, with this ground glass plate being illuminated in such a way by a sideway (lateral) floodlight that the light intensity of each junction comprising up to ($n-1$) light-conducting fiber optics, is being compensated by the floodlight, whereas the light intensity of a junction in which all of the $n$ fiber optics are light-conducting, exceeds the floodlight intensity, for producing on the rear side of the ground glass plate a distinctly visible light spot.

As to the further relevant prior art, it is still to be noted that an optical scanning of punched cards with the aid of fiber optics is known per se. Thus, on page 108 of "Electronic Industries" for Dec. 1961, there is described a method according to which the fiber optic bundle is associated with each column of punched card holes, with the free ends of the fiber optics of each bundle being arranged in a circular array such that one code character (column of card) of the circular array is adjacent to the preceding character. When scanning the circular array of the ends of the fiber optics in sequence, the punched-card information can be read out extremely rapidly. A decoding of the information, however, is not mentioned in this article.

The invention will be explained in detail with reference to the accompanying drawing, in which:

FIG. 1a, in a top view, shows a cross cutaway portion of a five-channel perforated tape. In this case there is used a two-out-of-five code, and the shown code, for which only the two top holes $a$ and $b$ are punched, does in plain text mean the FIG. 1.

Figure 1A:
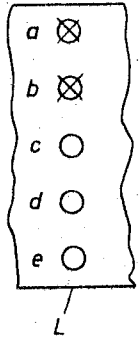
FIG. 1a illustrates one form of perforated tape that can be employed with the present invention.
Figure 1B:
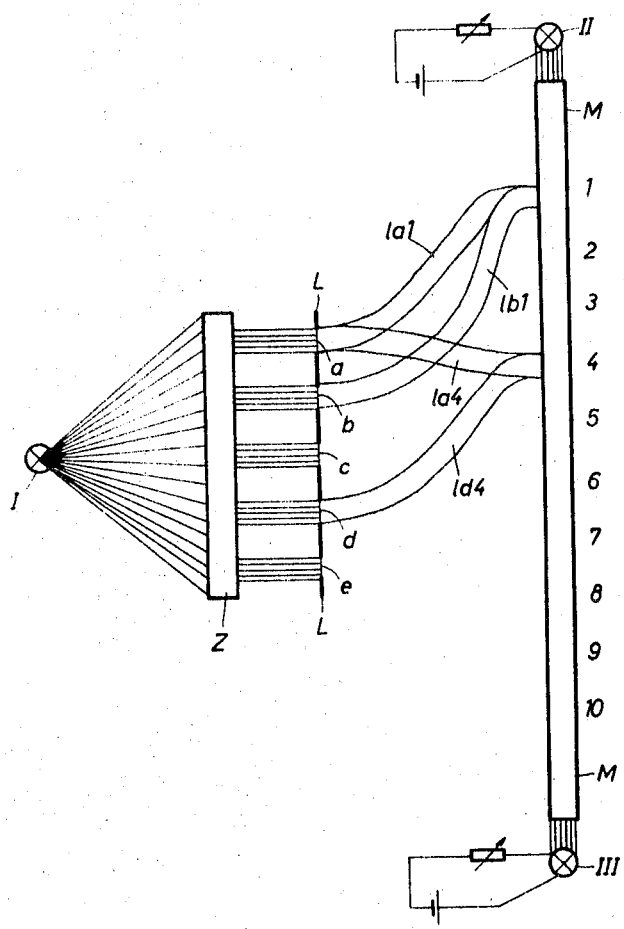
FIG. 1b is a schematic diagram of the optical decoder in accordance with the principles of the present invention.

Referring now to FIG. 1b, the light coming from the lamp I is converted by the cylindrical lens Z into a parallel light beam illuminating the perforated tape L uniformly throughout its entire width. The light which, in the present example, is permitted to pass through only punched holes $a$ and $b$ is conducted by the fiber optics $1_{a1}$ and $1_{b1}$ to the junction of these two fiber optics. At this point, corresponding to the FIG. "1" in the one-out-of-ten plain text code, the ends of the fiber optics are bonded to one another so that the two individual light intensities are added to double the light intensity. The thusly intensified light impinges upon a ground glass plate M and produces on the rear side thereof, at point "1" a light spot.

In the two-out-of-five code, however, each code bit is combined with each other. Accordingly, fiber optics also extend from $a$ and $b$, which are joined to those fiber optics extending from $c$, $d$ and $e$. For example, as shown in FIG. 1b the fiber optics extending from $a$ and $d$ are joined at one point immediately in front of the ground glass plate, with this junction (point) corresponding in the initial one-out-of-ten code, to the FIG. "4". To this junction, as well as to the other junctions, namely 2, 3, 5, 7 and 8, the light is only fed via one fiber optics (in this particular case via $1_{a4}$). In the case of all other junctions except "1", the second fiber optic extends from a nonpunched code bit not permitting the passage of light. Hence, at the junctions 2 to 5 as well as 7 and 8 there only exists half the light intensity as compared with the light intensity at "1".

This difference in light intensity may now be easily utilized for the decoding purpose. For example, as shown in FIG. 1b, there may be used a ground glass plate M which, on the principle of the Bunsen grease-spot photometer, and with the aid of a sideway floodlight (lamps II and III), is illuminated in such a way that the light intensity in the case of only one "active" fiber optics (hence, in the given example, at the junctions 2...5, 7, 8) is being compensated by the floodlight, whereas the light intensity at point "1" exceeds the floodlight intensity, so that at this, and only this point, on the rear side of the ground glass plate a light or luminous spot will become visible.

Accordingly, the method as proposed by the inventive method is in particular intended for effecting a visual indication. An indication such as this may be desirable, e.g., in connection with the evaluation of fault reports in telephone switching systems, with the failure-in-dictating information existing in the form a perforated tape having to be decoded at the exchange or office where it is required to be indicated on an indicator board.

Of course, the output signal, with the aid of photoelectric cells responding to a definite threshold value of the light intensity, may also be converted into electric energy and can be used for actuating automatic control systems. Compared with the aforementioned conventional methods, however, double the number of photocells is required to this end but, on the other hand, a special decoding matrix can be saved, thus, increasing the reliability by excluding one source of error or trouble (defective diodes).

While I have described above the principles of my invention in connection with specific apparatus, it is to be clearly understood that this description is made only by way of example and not as a limitation to the scope of my invention as set forth in the objects thereof and in the accompanying claims.

We claim:

1. A method of converting a perforated-tape code, preferably an $n$-out-of-$m$ code, into plain text comprising the steps of:

scanning the individual code bits of a code combination by different parallel light beams;

disposing fiber optics to have one end thereof adjacent the tape carrying said code in light communication with said light beams pass through holes in said tape representing one condition of a code bit;

joining the other end of $n$ of said fiber optics at $n$-out-of-$m$ different junctions corresponding to the plain text so that the light beams passing through the $n$ holes of a code combination are conducted to the junction of said $n$ of said fiber optics to produce a light intensity which is distinct from the light intensity of any other junction where less than $n$ fiber optics are involved in the conduction of light;

receiving the light at said other end of said fiber optics on a ground glass plate; and illuminating said ground glass plate to compensate the intensity of the light at all junctions where ($n-1$) fiber optics conduct light and to produce a distinctly visible light spot on the rear side of said ground glass plate at a junction where all $n$ fiber optics conduct light.

2. The method according to claim 1 where said $n$-out-of-$m$ code is a two-out-of-$m$ code.